US010715196B1

(12) United States Patent
Yeste Ojeda et al.

(10) Patent No.: US 10,715,196 B1
(45) Date of Patent: Jul. 14, 2020

(54) INTEGRATED CIRCUIT FOR SCALABLE BEAMFORMING AND FREQUENCY CHANNELIZATION

(71) Applicant: Associated Universities, Inc., Washington, DC (US)

(72) Inventors: Omar Artemi Yeste Ojeda, Gordonsville, VA (US); Stephen Daniel Wunduke, Beaverdam, VA (US)

(73) Assignee: Associated Universities, Inc., Washington, DC (US)

( * ) Notice: Subject to any disclaimer, the term of this patent is extended or adjusted under 35 U.S.C. 154(b) by 0 days.

(21) Appl. No.: 16/686,636

(22) Filed: Nov. 18, 2019

Related U.S. Application Data

(60) Provisional application No. 62/794,151, filed on Jan. 18, 2019.

(51) Int. Cl.
*H04B 1/38* (2015.01)
*H04B 1/18* (2006.01)
*H04B 1/04* (2006.01)

(52) U.S. Cl.
CPC .............. *H04B 1/18* (2013.01); *H04B 1/04* (2013.01); *H04B 2001/045* (2013.01); *H04B 2001/0441* (2013.01)

(58) Field of Classification Search
CPC ... H04B 1/18; H04B 1/40; H04B 1/04; H04B 1/16
See application file for complete search history.

(56) References Cited

U.S. PATENT DOCUMENTS

| 6,701,141 | B2 | 3/2004 | Lam | |
|---|---|---|---|---|
| 7,260,141 | B2* | 8/2007 | Bierly | H01Q 3/26 375/222 |
| 8,002,708 | B2* | 8/2011 | Shah | G01S 7/52023 367/123 |
| 9,482,736 | B1 | 11/2016 | Ray et al. | |
| 9,628,164 | B1 | 4/2017 | Thompson et al. | |
| 2006/0173335 | A1 | 8/2006 | Shah et al. | |
| 2011/0122026 | A1 | 5/2011 | DeLaquil et al. | |
| 2012/0299765 | A1* | 11/2012 | Huang | H01Q 21/205 342/81 |
| 2014/0292492 | A1 | 10/2014 | Sadr | |
| 2015/0063488 | A1 | 3/2015 | Dinan | |
| 2017/0262398 | A1 | 9/2017 | Lugo et al. | |

OTHER PUBLICATIONS

PCT Search Report and Written Opinion for PCT/US19/61954, dated Feb. 3, 2020.

* cited by examiner

*Primary Examiner* — Tuan Pham
(74) *Attorney, Agent, or Firm* — Remenick PLLC

(57) ABSTRACT

A general-purpose integrated circuit capable of scaling to meet the requirements of a beamforming system for a wide range of applications and benefit from economies of scale is disclosed. The integrated circuit includes a delay and phase correcting engine in order to reference the incoming data to a common array center and steering direction. It also includes a frequency channelization engine to perform phase-shift beamforming tasks effectively and/or frequency channelize the output data stream. A flexible reconfigurable routing logic can be included, which allows a multiplicity of operation modes, and generates a multiplicity of linear combinations of the input and internally generated data streams.

18 Claims, 17 Drawing Sheets

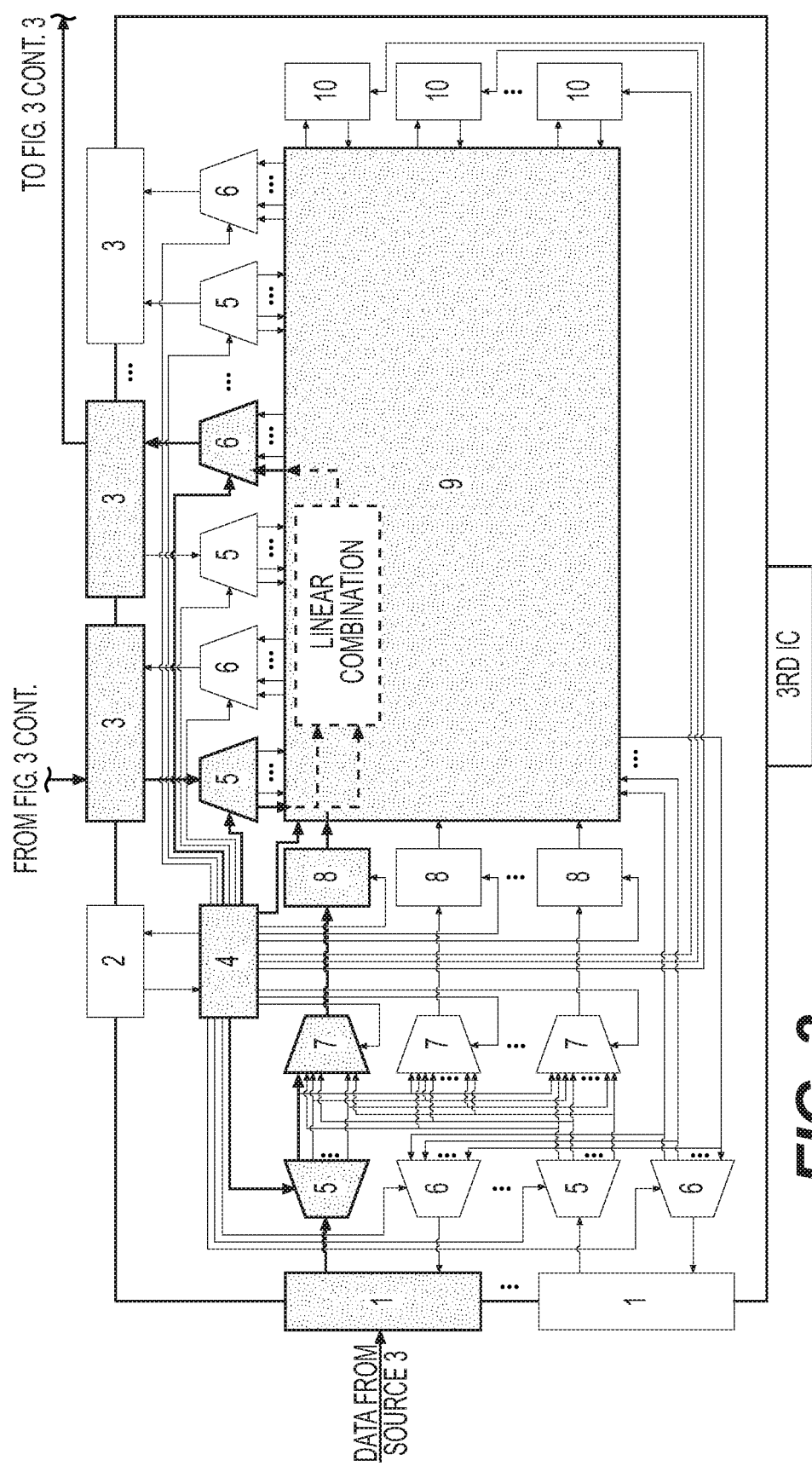
FIG. 3 (CONT. 2)

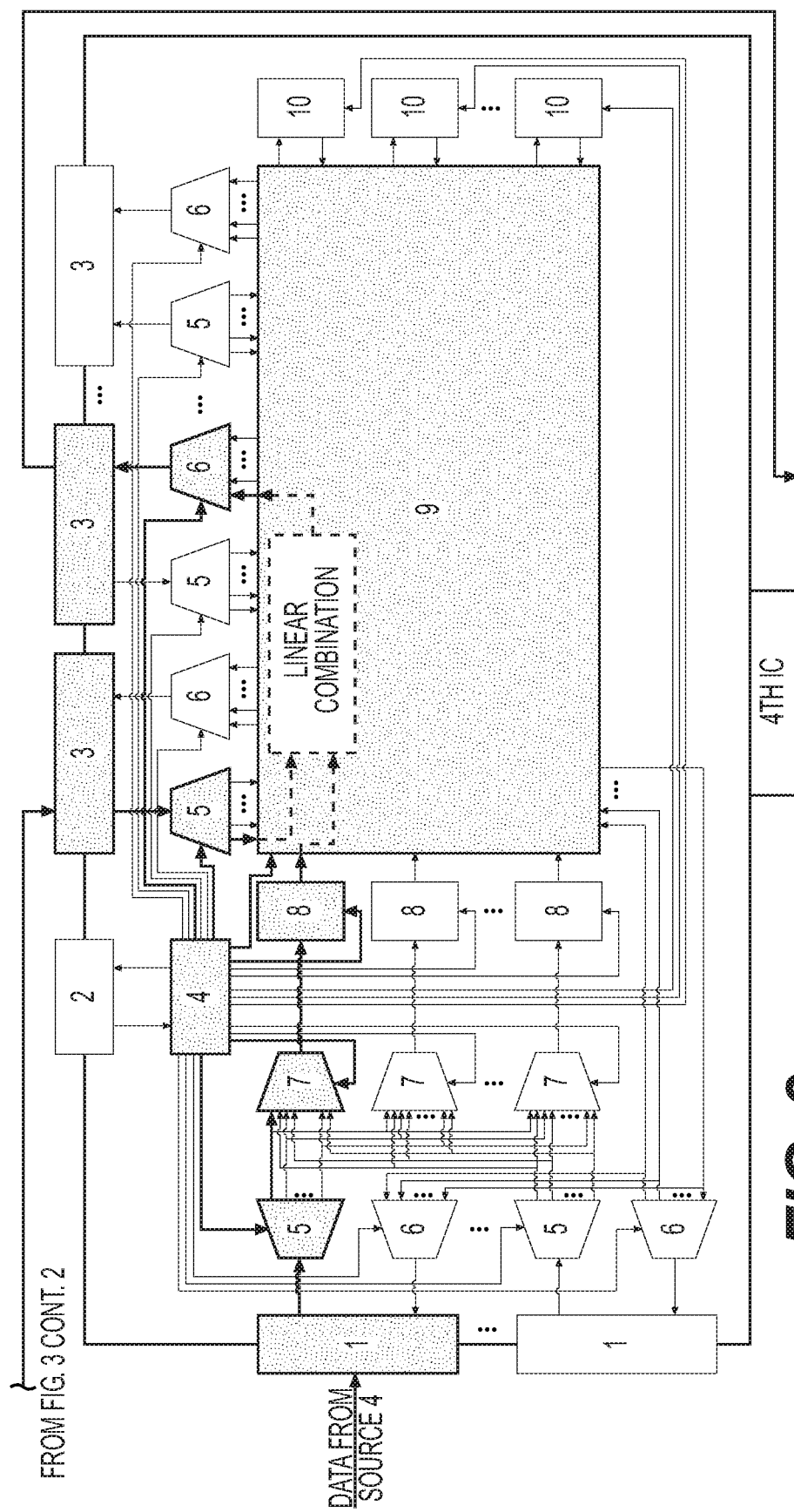
FIG. 3 (CONT. 3)

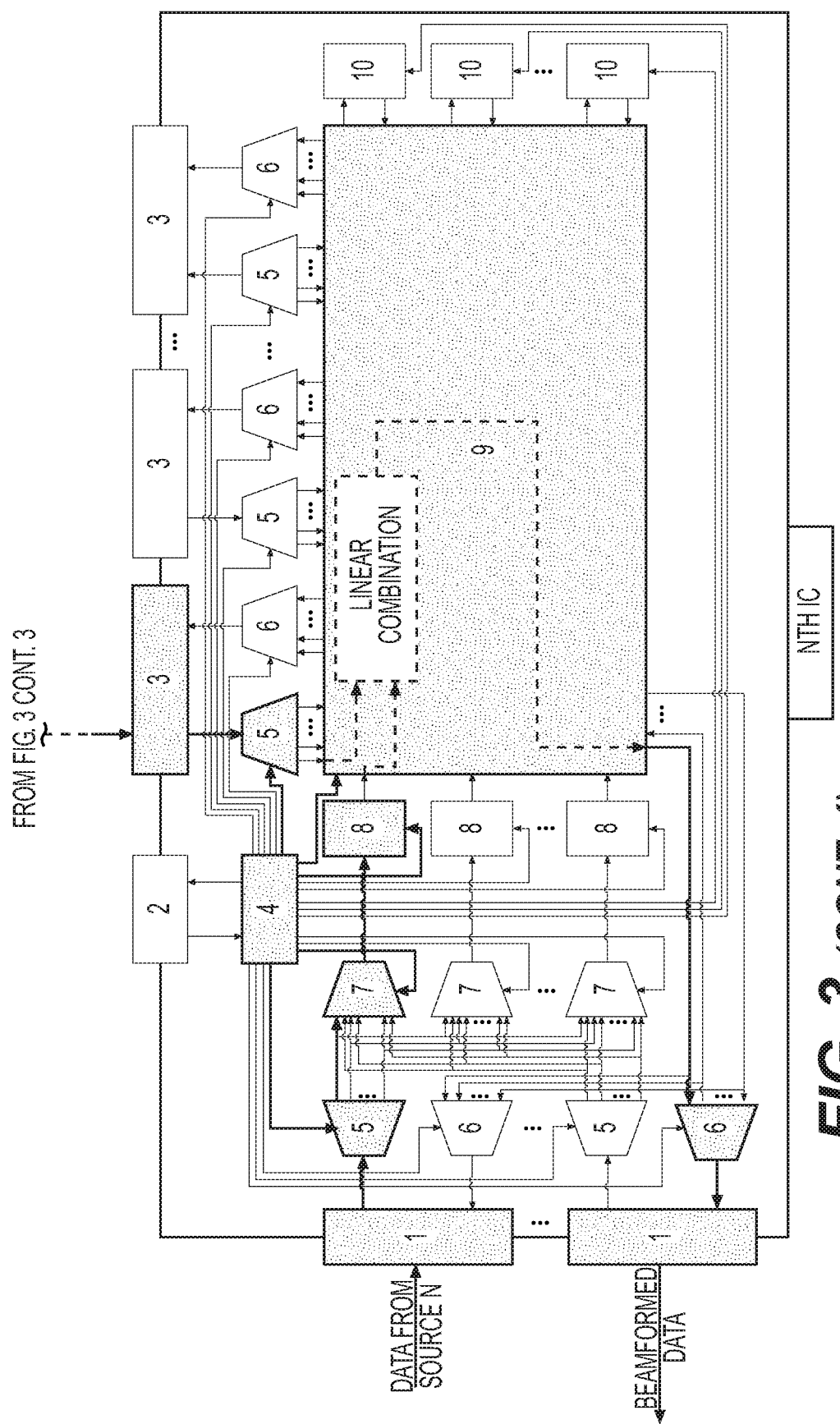
FIG. 3 (CONT. 4)

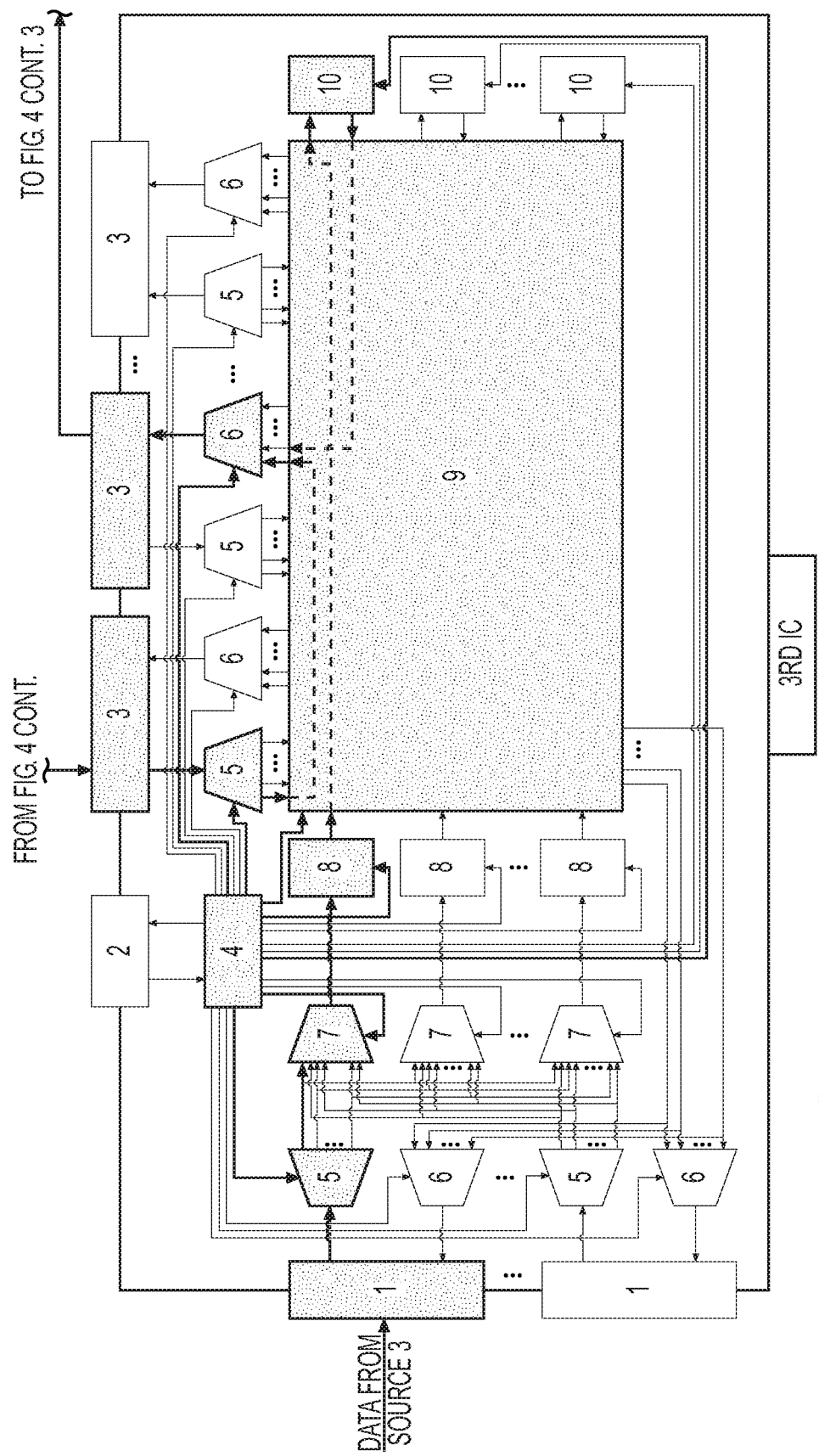
FIG. 4 (CONT. 2)

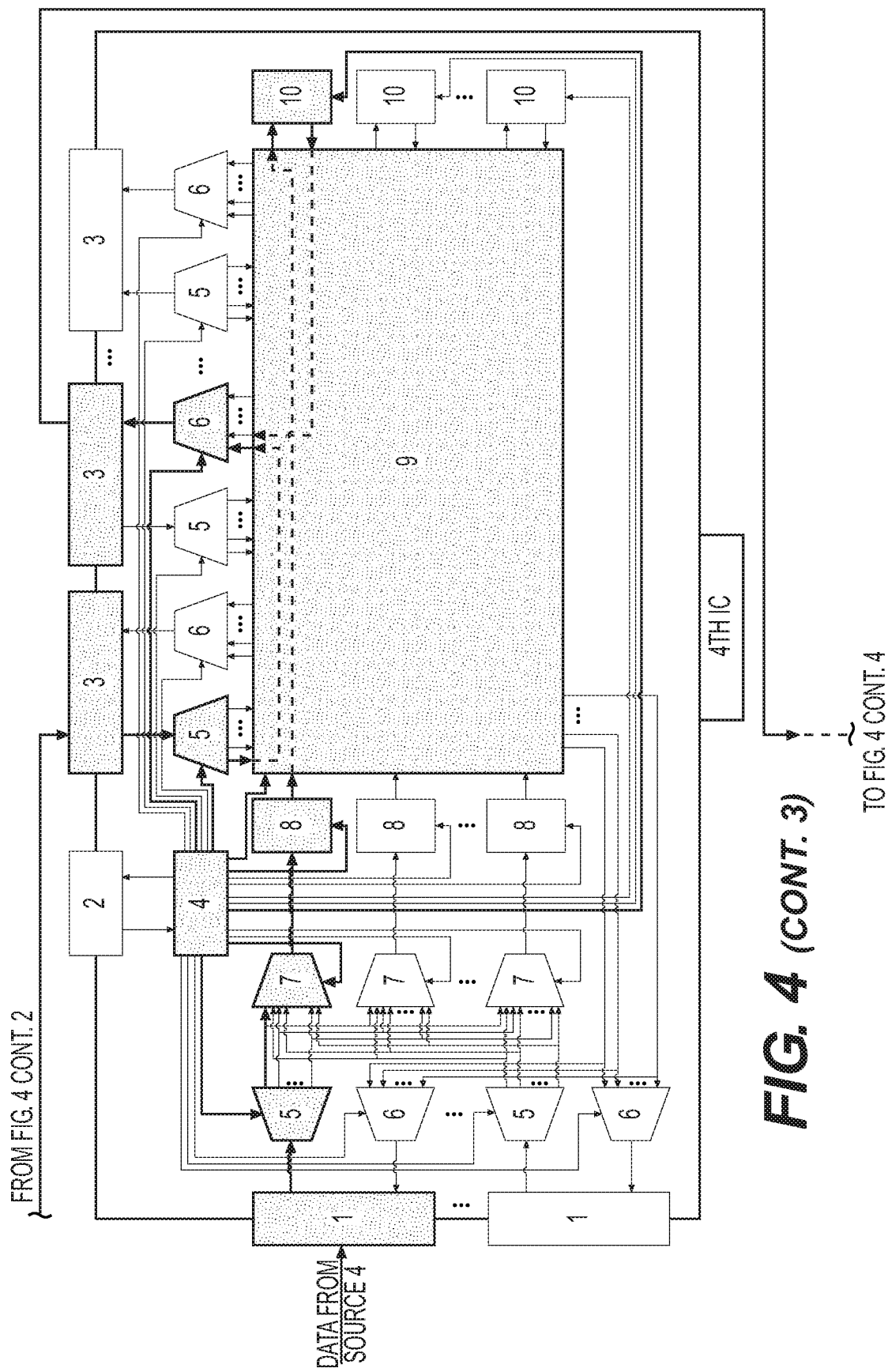
FIG. 4 (CONT. 3)

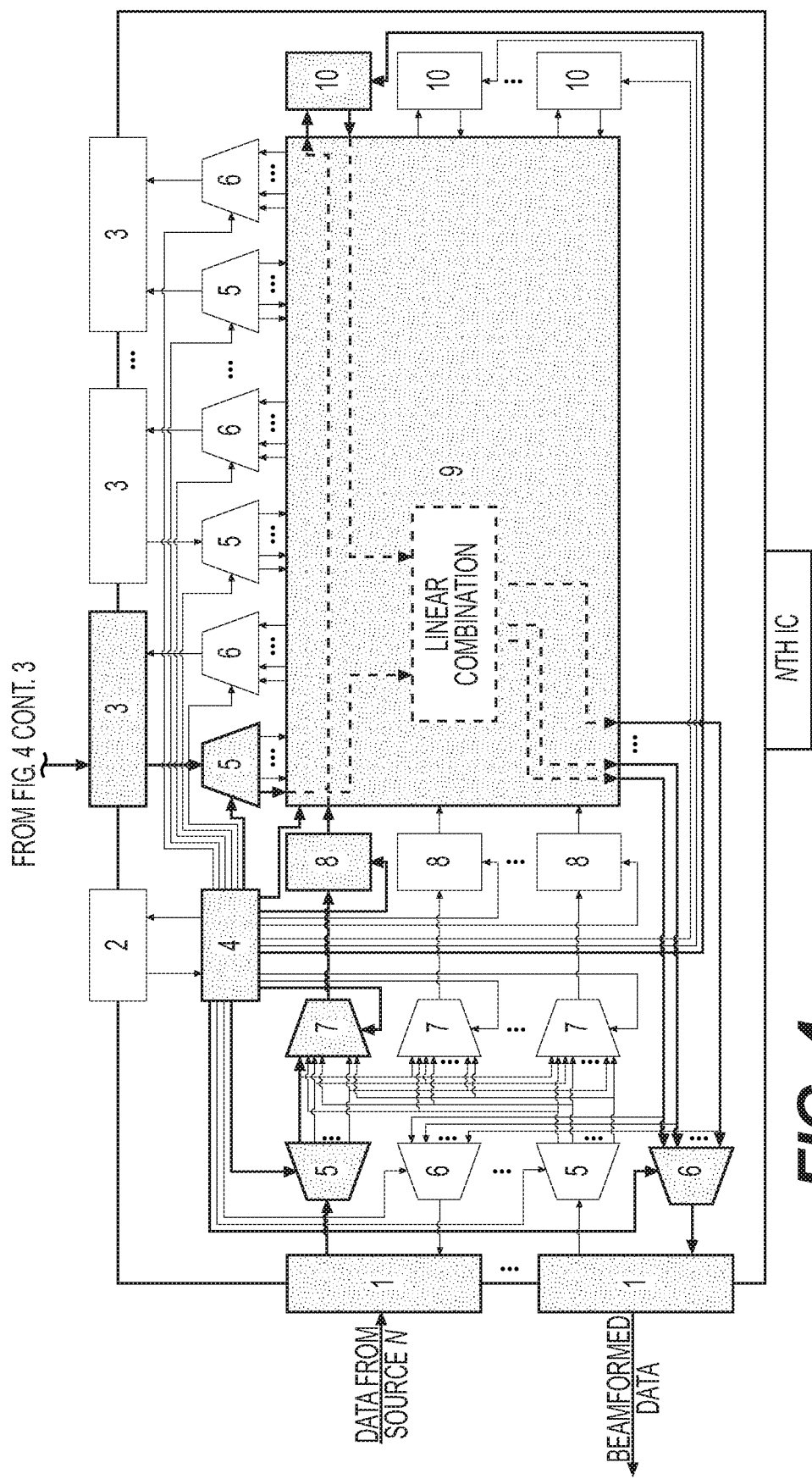
FIG. 4 (CONT. 4)

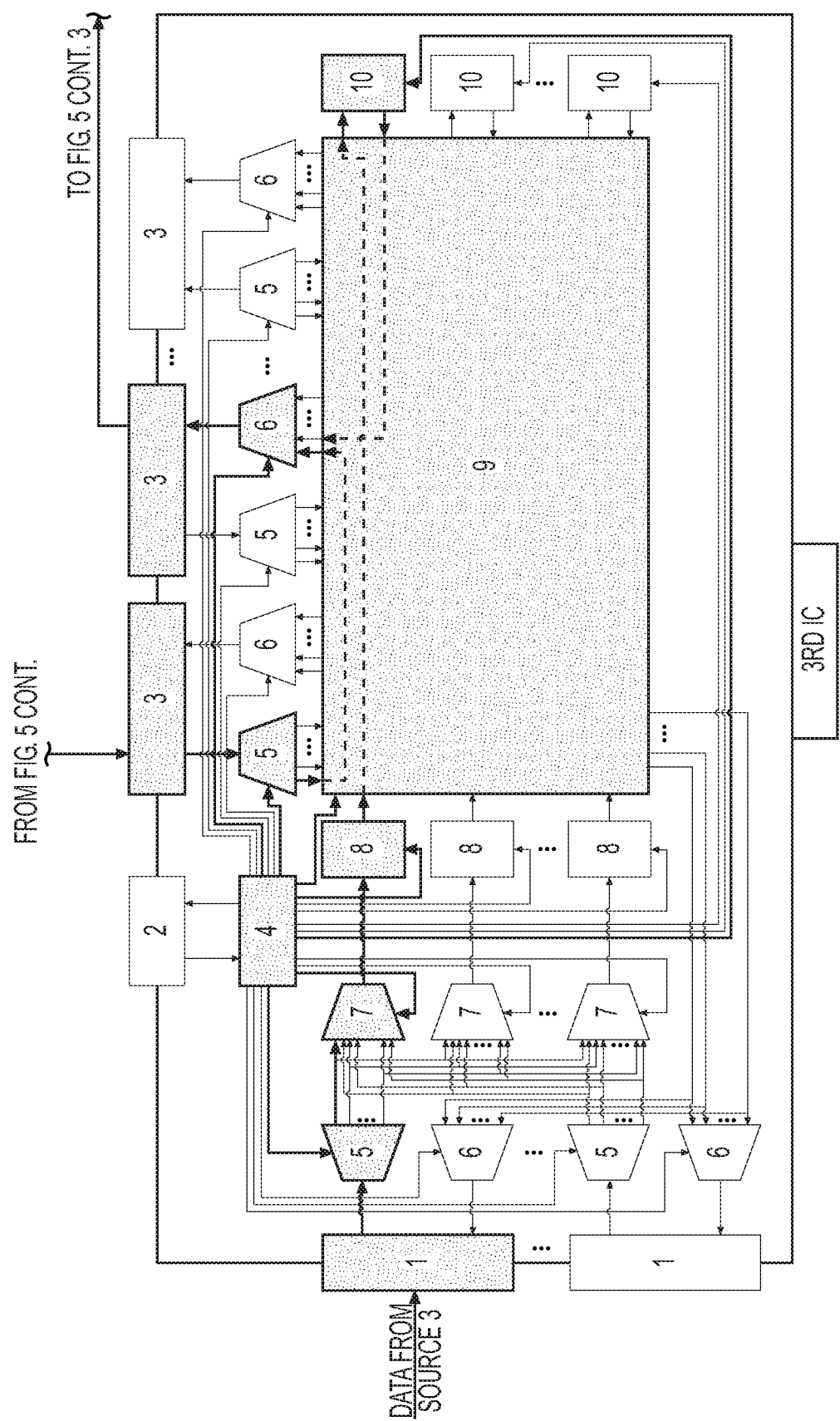
FIG. 5 (CONT. 2)

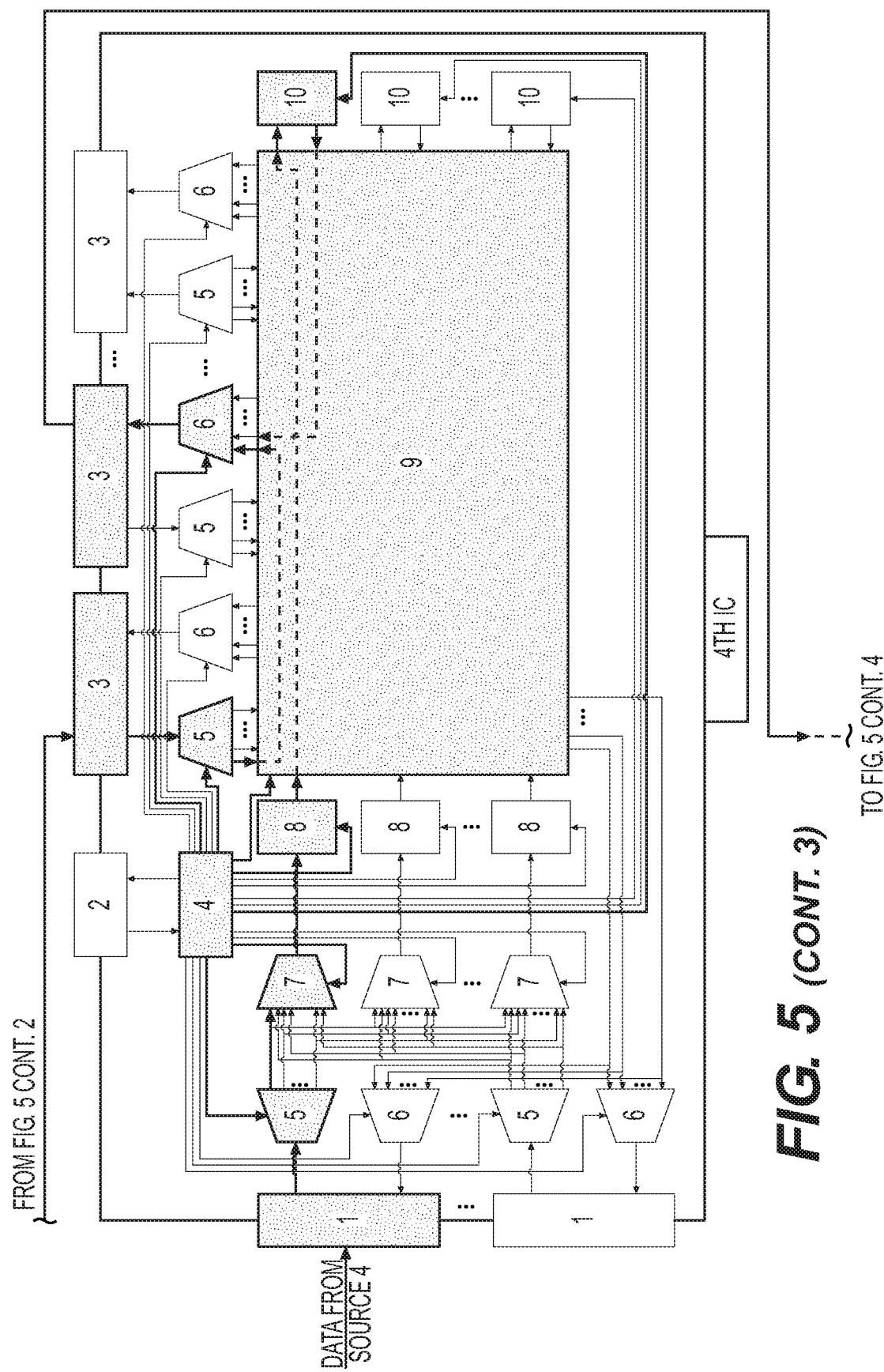
FIG. 5 (CONT. 3)

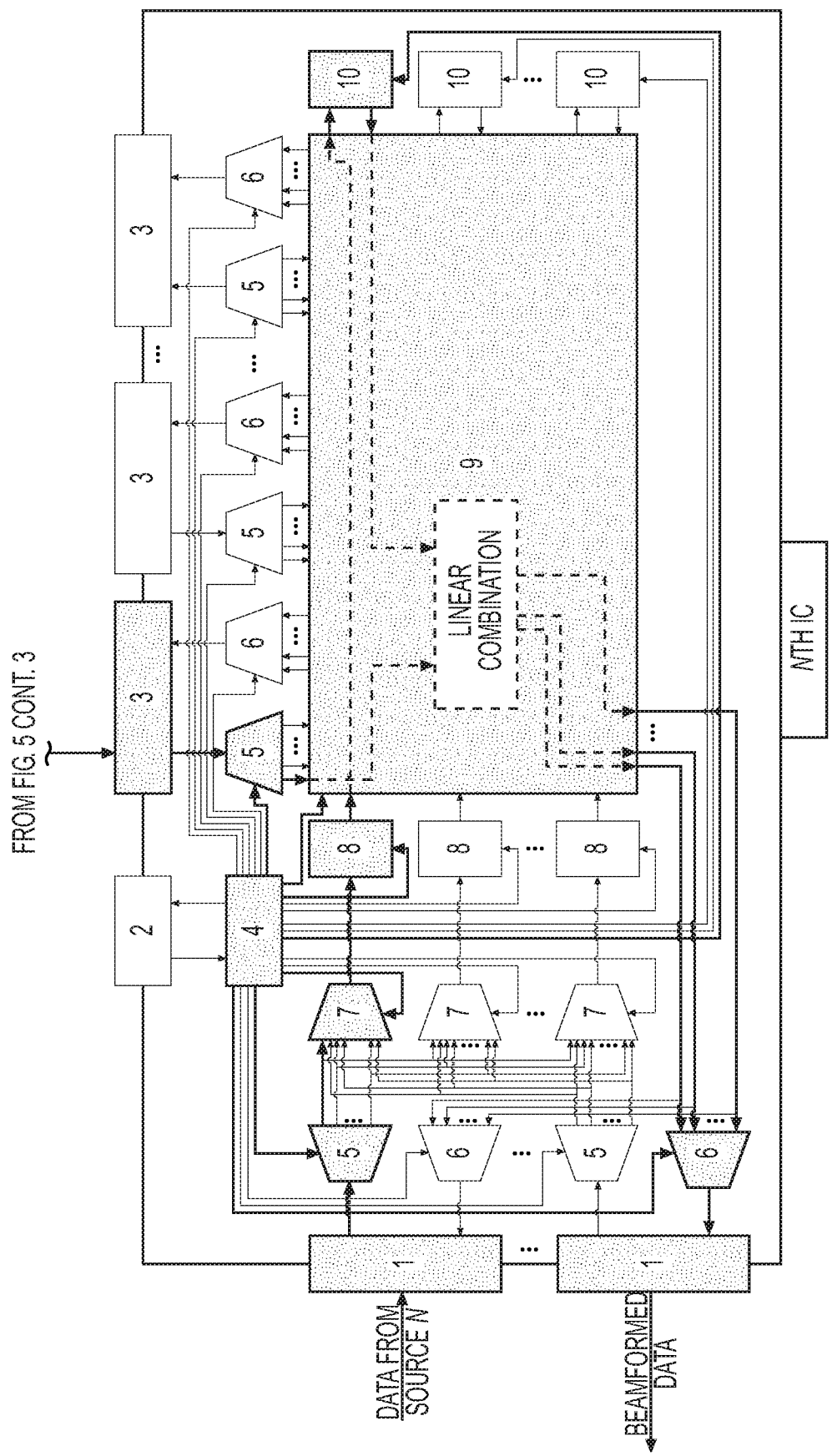
FIG. 5 (CONT. 4)

INTEGRATED CIRCUIT FOR SCALABLE BEAMFORMING AND FREQUENCY CHANNELIZATION

REFERENCE TO RELATED APPLICATIONS

This application claims priority to U.S. Provisional Application No. 62/794,151, filed Jan. 18, 2019, entitled "Integrated Circuit for Scalable Beamforming and Frequency Channelization," and hereby specifically and entirely incorporated by reference.

RIGHTS IN THE INVENTION

This invention was made with government support under NSF #1640131, between the National Science Foundation and Associated Universities, Inc., and, accordingly, the United States government has certain rights in this invention.

BACKGROUND

1. Field of the Invention

This invention is directed to an integrated circuit that may be connected to identical replicas of itself according to a network topology. By adjusting the number of integrated circuits in the network, the resulting hardware can perform beamforming and frequency channelization tasks on sensor arrays having a number of sensors, sensor bandwidths, number of beams, fields of view and array configurations.

2. Description of the Background

Beamforming is a signal processing technique for sensor arrays that utilizes spatial filtering to optimize signal reception by a particular receiver and reduces interference for nearby transmitters in the process. Beamforming can help base stations arrayed with dozens or hundreds of individual antennas to make use of the frequency spectrum more efficiently. In radio communications, the primary challenge for digital signal processing is to reduce interference while transmitting more information from many sources at once. Signal-processing algorithms plot the best transmission route through the air to each receiver. Then signal sources can send individual data packets in many different directions, bouncing signals off buildings and other objects in a precisely coordinated pattern. By organizing the packets' movements and arrival time, beamforming allows many receivers and sources on an array to exchange much more information at once. Beamforming is also an integral part of modern detection, ranging and/or navigation systems such as radars or sonars.

Beamforming and frequency channelization are used in many modern high bandwidth applications. The progress of digital signal processing (DSP) has enabled an increasing trend in signal bandwidth and the number of sensors in an array in order to maximize the performance. As a result, beamforming and frequency channelization tasks must be carried out by a multiplicity of integrated circuits (ICs), which can number in the thousands. Furthermore, previous DSP solutions must be designed ad hoc and they are mostly based on either field-programmable gate arrays (FPGAs) or application-specific integrated circuits (ASICs), which significantly increases the development cost.

The idea of interconnecting multiple ICs following a scalable architecture has been entertained previously. For example, U.S. Pat. No. 8,002,708 claims a scalable beamforming architecture for ultrasound applications based on the replication of one special-purpose ASIC. US Patent Application 2017/0262398 refers to a digital beamforming system based on the interconnection of multiple ASICs of the same kind. Both references are dedicated to tackling the scalability challenges of beamforming. Whereas they are fundamentally based on the use of ASICs, they ultimately fail to provide a general-purpose IC solution for a range of applications wide enough to break the development and fabrication costs barrier.

U.S. Pat. No. 9,628,164 claims a beamforming system based on the deserialization of an input data stream, which is then upsampled by insertion of zeros into each of the resulting data streams. Data streams corresponding to different sources can be combined into a single stream before a polyphase-decimating filter performs the downsampling of the data stream. Such a system could arguably be used for fractional delay correction, as part of the delay and phase correcting sub-element described in the following. Nonetheless, this sub-element is preferably implemented through a resampler, which offers enhanced flexibility and accuracy.

Additionally, U.S. Pat. No. 6,701,141 discloses a system and method of true time-delay beamforming based on a mixed-signal IC that applies a delay correction in the digital domain after digitization of the analog input signal. The resulting corrected signal is transformed back to the analog domain prior to its combination with other analog signals from different sources, which have been delayed through other replicas of the claimed IC. As with the rest of the existing systems, this system only operates in true time-delay (TTD) beamforming mode only, as it lacks the frequency-channelizing engine required by effective phase-shift beamforming. A further difference is that such system combines the signals from different sensors in the analog domain.

U.S. Pat. No. 7,260,141 describes a system and method for modulating and demodulating signals transmitted and received through a phased array antenna, which are based on a shared baseband processor. Although that invention includes an independent frequency channelizer for each of the signals received from different antenna elements, it is limited to phase-shift beamforming tasks only. Moreover, the disclosed solution may suffer from reduced scalability, as it employs a baseband processor shared by all the data streams to be processed.

US Patent Application 2011/0122026 concerns a scalable, reconfigurable true time-delay analog beamformer, and hence fundamentally differing from the present invention in that the present invention operates exclusively in the digital signal domain. Modern digital beamforming methods are more reliable and accurate, among many other advantages. Furthermore, that system is reconfigurable only in the sense that it can steer the formed beam, which is a feature readily achieved when beamforming tasks are performed in the digital domain.

Therefore, a general-purpose IC architecture capable of scaling to meet requirements in a wide range of applications is mandatory to benefit from economies of scale. Furthermore, there is a need to solve one of the limitations of existing systems, which is the lack of flexibility of the ASICs designed for performing beamforming tasks in those systems. Overcoming such limitation is a prerequisite to benefiting from economies of scale.

SUMMARY

The present invention overcomes the problems and disadvantages associated with current strategies and designs and provides new tools and methods for scalable beamforming and frequency channelization.

One embodiment of the invention is directed to an integrated circuit. The integrated circuit comprises: one or more input/output interfaces, wherein each input/output interface receives sensor data streams from external sensors and outputs internally generated data streams; one or more delay and phase correcting blocks, each delay and phase correcting block receiving sensor data streams from the one or more input/output interface and outputting a delay and phase corrected data stream; one or more beamforming data interfaces, each beamforming data interface adapted to send the internally generated data streams and receive beamforming data streams; one or more frequency channelizers, each frequency channelizer adapted to split a data stream into multiple channelized data streams, each channelized data stream comprising information from a different range of frequency components; and a linear combination and routing logic device. The linear combination and routing logic device: inputs one or more of the delay and phase corrected data streams, the beamforming data streams, and the channelized data streams; combines the one or more of the delay and phase corrected data streams, the beamforming data streams, and the channelized data streams into the internally generated data streams; and discards or routes the internally generated data stream to one or more of the input/output interfaces or the beamforming data interfaces; or routes one or more of the internally generated data streams toward the input of at least one of the one or more frequency channelizers.

In a preferred embodiment, the data communications are secured by cryptography. Preferably, the cryptograph is at least one of encryption or authentication. The integrated circuit preferably further comprises one or more deserializers, wherein each deserializer demultiplexes a data stream. Preferably, the integrated circuit further comprises one or more serializer, wherein each serializer multiplexes one or more data streams into a single data stream. Preferably, the integrated circuit further comprises one or more independent selectors, wherein the independent selectors route the sensor data streams to a delay and phase correcting block. Preferably, there is one selector for each delay and phase correcting block.

In a preferred embodiment, the integrated circuit further comprises a configuration and control block in communication with each component in the integrated circuit. Preferably, each delay and phase correcting block applies a fractional or sub-sample delay to its sensor data stream, wherein the delay is determined by the configuration and control block based on parameters updated externally through a control interface. Preferably, each delay and phase correcting block applies a phase correction to its sensor data stream, wherein the phase correction is determined by parameters sent from the configuration and control block. In a preferred embodiment, the sensor data stream is pre-processed.

Preferably there are a plurality of the integrated circuits. Preferably, each beamforming data interface intercommunicates with at least one other beamforming data interface intercommunicates of another integrated circuit. Preferably, the plurality of integrated circuits comprises, in series, a first integrated circuit, one or more intermediary integrated circuits, and a last integrated circuit.

Preferably, the first integrated circuit routes a first delay and phase corrected sensor data stream from a first sensor to a first intermediary integrated circuit through one of the first integrated circuit's one or more beamforming data interfaces; a first intermediary integrated circuit receives the first delay and phase corrected sensor data stream from the first integrated circuit through one of the first intermediary integrated circuit's one or more beamforming data interfaces; the first intermediary integrated circuit obtains a second delay and phase corrected sensor data stream from a second sensor; the first intermediary integrated circuit linearly combines the first and second delay and phase corrected sensor data streams into a linearly combined data stream; the first intermediary integrated circuit routes the linearly combined data stream to another integrated circuit through one of the first intermediary integrated circuit's one or more beamforming data interfaces; each additional intermediary integrated circuit receives a linearly combined data stream from a previous intermediary integrated circuit through one of the additional intermediary integrated circuit's one or more beamforming data interfaces; the additional intermediary integrated circuit obtains a delay and phase corrected sensor data stream from an associated sensor; the additional intermediary integrated circuit linearly combines the linearly combined data stream from a previous intermediary integrated circuit and the delay and phase corrected data stream from an associated sensor into another linearly combined data stream; each additional intermediary integrated circuit routes the another linearly combined data stream to another integrated circuit through one of the additional intermediary integrated circuit's one or more beamforming data interfaces; the last integrated circuit receives linearly combined data stream from a previous intermediary integrated circuit through one of the last integrated circuit's one or more beamforming data interfaces; the last integrated circuit obtains a last delay and phase corrected sensor data stream from a last sensor; the last integrated circuit linearly combines the linearly combined data stream from the previous intermediary integrated circuit and the last delay and phase corrected sensor data stream into a last linearly combined data stream; and the last integrated circuit transmits the last linearly combined data stream from one of the last integrated circuit's one or more input/output interfaces. Preferably, the last integrated circuit applies a frequency channelization to each or a subset of the linear combination data streams.

In a preferred embodiment, the first integrated circuit applies frequency channelization to a first delay and phase corrected sensor data stream; the first integrated circuit transmits a subset of frequency channels to a first intermediary integrated circuit through one or more of the first integrated circuit's beamforming data interfaces; a first intermediary integrated circuit applies frequency channelization to a second delay and phase corrected sensor data stream; the first intermediary integrated circuit selects channels that correspond to the subset of frequency channels of the first integrated circuit; the first intermediary integrated circuit transmits the subset of frequency channels of the first integrated circuit and the first intermediary integrated circuit to a subsequent intermediary integrated circuit through one or more of the first intermediary integrated circuit's beamforming data interfaces; each additional intermediary integrated circuit applies frequency channelization to an associated delay and phase corrected sensor data stream; the additional intermediary integrated circuit selects channels that correspond to the subset of frequency channels of a previous intermediary integrated circuit; the additional intermediary integrated circuit transmits the subset of frequency channels of the previous intermediary integrated circuit and the additional intermediary integrated circuit to a subsequent intermediary integrated circuit through one or more of the additional intermediary integrated circuit's beamforming data interfaces; the last integrated circuit applies frequency channelization to a last delay and phase corrected sensor data stream; the last integrated circuit selects channels that correspond to the subset of frequency channels of a previous intermediary integrated circuit; and the last integrated circuit linearly combines the subset of frequency channels of the previous intermediary integrated circuit and the last integrated circuit to generate a number of beams through phase-shift beamforming.

Preferably, at least one intermediary integrated circuit applies a frequency channelization to one or more input data streams, outputs the frequency channelized data stream through at least one of the input/output interfaces, and receives and subsequently relays, through at least one beamforming data interfaces, beamforming data streams, unprocessed, to a subsequent integrated.

Other embodiments and advantages of the invention are set forth in part in the description, which follows, and in part, may be obvious from this description, or may be learned from the practice of the invention.

DESCRIPTION OF THE INVENTION

The integrated circuit (IC) is preferably used within the receiver of an array of sensors to improve, at least in one configuration mode, the radiation pattern of an individual sensor through beamforming. Specifically, the IC is preferably a power-efficient implementation of a modular component of a scalable architecture of a central signal processor (CSP). The IC could be used as a building block of the CSP of a beamforming system of any size. This will preferably dramatically reduce the CSP part of the cost of building and operating said systems.

The applications that will benefit the most from the envisioned IC are those involving arrays made of many sensors. Digitizing the signal at every single sensor and forming multiple beams generates a vast amount of data that must be handled by complex ASICs or big FPGAs, which in many cases cannot satisfy Size, Weight and Power (SWaP) specifications of the system, especially when they are to be installed in autonomous products. One exemplary use case of the present invention is within the core of the DSP engine of an electronically scanned synthetic aperture radar (SAR) in an unmanned aerial vehicle (UAV) or a satellite. Other representative application examples are massive-MIMO devices for 5G communications and the Internet of Things (IoT), technologies currently under development that will become ubiquitous in the near future. The extent of application fields is huge, from through-the-wall vision devices to biomedical scanners, including sonar imagery and radio astronomy, just to name a few.

Flexibility is achieved as follows. Firstly, by incorporating within the same chip a frequency-channelizing engine, or a multiplicity thereof, in addition to a delay and phase correcting engine, or a multiplicity thereof. Secondly, through a routing and combinatory logic that can be reconfigured on the fly for operation in different modes. Finally, by providing a data path for internally processed sensor data to be transmitted to other ICs through the interconnection interfaces, alone or along with beamformed data. The above features provide the invention with the flexibility required to suit a variety of applications and, thus, benefit from economies of scale.

Figure 1:
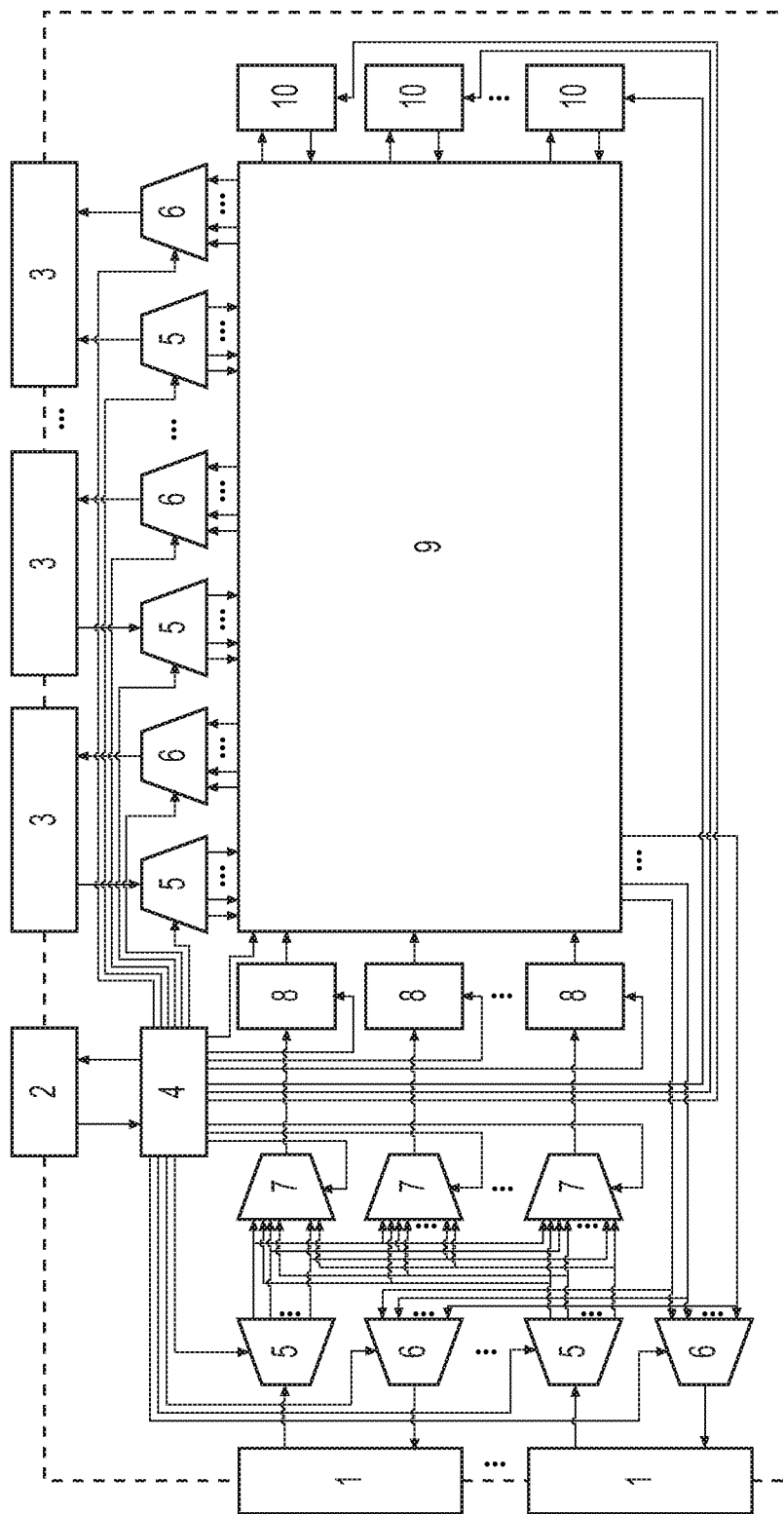
FIG. 1 An embodiment of an integrated circuit comprising one or more input/output interfaces, one or more engines to apply delay and phase corrections, one or more engines to perform frequency channelization, and additional routing and combinatorial logic.

FIG. 1 depicts an embodiment of the IC. The IC preferably comprises one or more input/output (I/O) interfaces (1) whereby data from the sensor array are received. These I/O interfaces are preferably high-speed serializer/deserializer (SerDes) interfaces. The data may have been preprocessed externally to the IC. For example, an analog-to-digital converter may be used to digitize the analog signal out from the sensor. This signal could be directly sent to the IC through one or more of its I/O interfaces, or it may be split by another device into spectral sub-bands, which themselves may be sent to different instances of the IC. In addition, data streams from one or more sensors may have been multiplexed in time prior to being sent to the IC. To account for this, the IC may comprise one or more deserializers (5) which generate parallel data streams as needed.

One or more processing blocks preferably apply independent delay and phase corrections (8) onto the incoming data stream. When the output from the I/O interfaces has been deserialized into more than one data stream, or when more than one physical I/O interface is employed, a plurality of independent selectors (7) may be used to route any of the input data streams to any of the delay and phase correcting blocks. Preferably, there is one selector per delay and phase correcting block. Hardwiring each of the data streams generated by the deserializer to each of the delay and phase correcting block is also an option.

Each delay and phase correcting block preferably has two applications. On the one hand, a delay and phase correcting block preferably applies a fractional or sub-sample delay (in addition to a major or bulk delay) to its input data stream according to a given model. This allows steering the formed beam virtually towards any direction in the space regardless of the sensor array configuration. It may be achieved through a variety of methods, such as an interpolator or the oversampling method described in U.S. Pat. No. 9,628,164 (hereby incorporated by reference). The current delay may be computed internally from a model, which is determined by a configuration and control block (4). Alternatively, the configuration and control block may compute the current delay internally, which is then sent to each of the delay and phase correcting blocks. The parameters defining the delay model, e.g., according to a polynomial function of time, may be updated externally through a control interface (2) on a periodic or asynchronous basis. The order of the polynomial function describing the delay correction may be zero, resulting in a constant delay correction, and hence, a fixed steering direction of the formed beam with respect to the array of sensors. However, a higher order delay model may be useful in applications having faster dynamics, or alternatively the constant delay model may be updated at the required faster rate through the control interface.

The second application of each delay and phase correcting block (8) is preferably to apply a phase correction to the input data stream. The phase correction may be achieved by complex multiplication with a phasor obtained through a parametrized polynomial function of a phase accumulator used as the input of a sine/cosine lookup table. Alternatively, a coordinate rotation digital computer (CORDIC) can be employed for generating the phase correcting factor. The correction may be applied prior to or after the delay correction described herein, but the specific value of the correction varies in each case. A frequency correction may be necessary when the input data stream has been down-converted prior to the application of the delay correction (e.g., in radio frequency applications) or to compensate for a Doppler effect induced by an inaccurate delay model. Whereas a frequency correction is a phase correction that follows a first or higher order polynomial function of time, the frequency correction may be applied through a time varying phase correction. The current phase correction can be internally computed by the delay and phase correcting block from a set of parameters sent from the configuration and control block (4); or alternatively it can be computed internally at the configuration and control block and then sent to the delay and phase correcting block (8).

Preferably, each of the delay and phase correcting blocks references its input data stream to a common array phase center and front-wave direction in space. A plurality of delay and phase correcting blocks allows processing several input data streams using one common reference, which ultimately leads to one formed beam. Alternatively, the IC would allow processing a single input data stream for different directions and phase references, thereby enabling multiple independent radiation patterns or beams. The selectors at the input of the delay and phase correcting blocks allow one to alternate between any of these configuration modes, or a combination thereof. Moreover, a delay-phase model of order higher than zero may be used to vary with time the steering direction of the formed beam. Separate delay and phase correcting blocks allow steering their respective formed beams independently from one another. Furthermore, by enabling the ability to update the delay-phase model parameters through a low-speed interface and a configuration and control block, the delay-phase model preferably only needs to be accurate for the interval of application of those specific parameters, which itself allows simplifying the model required for a target accuracy.

Besides the I/O interfaces, one or more additional beamforming data interfaces (3) preferably allow intercommunication with other identical or compatible ICs. A set of serializers (6)/deserializers (5) may be used to multiplex/demultiplex various data streams into/from the beamforming data interfaces. Each of the data streams received through the beamforming data interfaces may be linearly combined with one or more of the delay and phase corrected data streams generated from the input data stream. This is achieved through a linear combination and routing logic (9). The resulting data streams may be discarded or routed to the transmitting part of one or more of the I/O or the beamforming data interfaces. A plurality of serializers (6) prior to the interfaces may be used to multiplex several data streams into one single interface.

Figure 2:
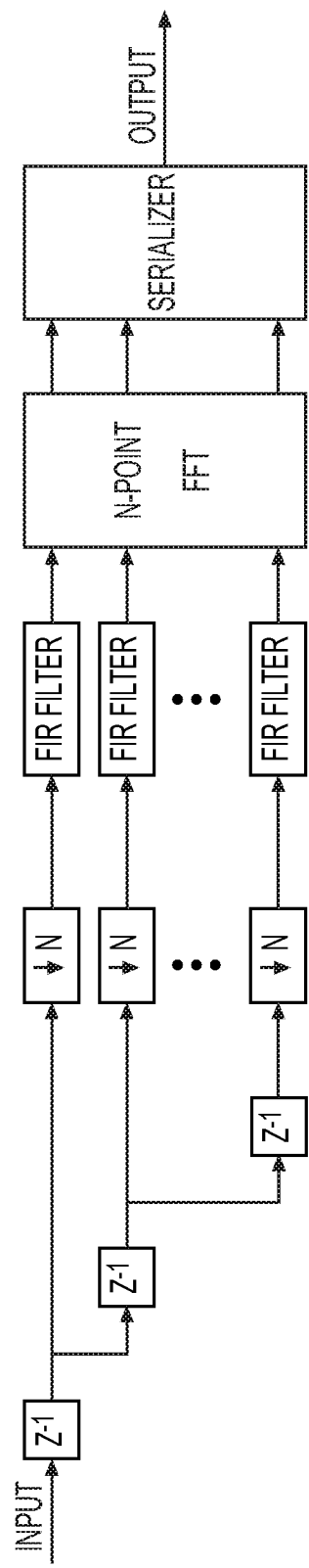
FIG. 2 An embodiment of an engine to perform frequency channelization, which is based on a polyphase Fast Fourier Transform (FFT) filter bank.

Furthermore, the linear combination and routing logic (9) preferably also connects with a plurality of frequency channelizers (10). A frequency channelizer splits its input data stream into multiple data streams, each of these corresponding to a reduced range of frequency components or channel. A frequency channelizer may be implemented through well-known methods, such as those based on a (polyphase) discrete Fourier transform filter bank. An exemplary embodiment of a frequency channelizer is shown in FIG. 2. According to FIG. 2, the input data stream is preferably deserialized into N data streams. Each of these streams is then preferably filtered through a Finite Impulse Response (FIR) filter, which results from the polyphase decomposition of a prototype analysis filter. The outputs of the FIR filters are preferably input to a Fast Fourier Transform (FFT) engine, which preferably efficiently performs the discrete Fourier transform of the Nx1 input vector at a rate N times slower than the input data rate. Finally, the output vector of the FFT engine is preferably deserialized and converted back to the input data rate by interleaving in time the data streams corresponding to different frequency channels of the input. The linear combination and routing logic (9) may be configured to route any of the input data streams, or any of the data streams resulting from a linear combination thereof, toward the input of any of the frequency channelizers (10). Similarly, the data streams at the output of the frequency channelizers preferably connect back to the linear combination and routing logic (9). Therein, said data streams may be linearly combined with any of the other data streams that are input into the linear combination and routing logic, such as any of the data streams generated by the delay and phase correcting blocks (8) or from the beamforming data interfaces (3).

The physical network topology may be a ring topology, with no first or last ICs, or may be linear or another topology. The first IC (in the logical topology) could be any IC within the ring. Some of the ICs can be bypassed (as the 2nd IC in FIG. 5) depending on the specific (sub-)array configuration. For example, when half the sensors (a first sub-array) are used for a true-time delay beamformer, and the other half (a second sub-array) are may be frequency channelized.

Figure 3:
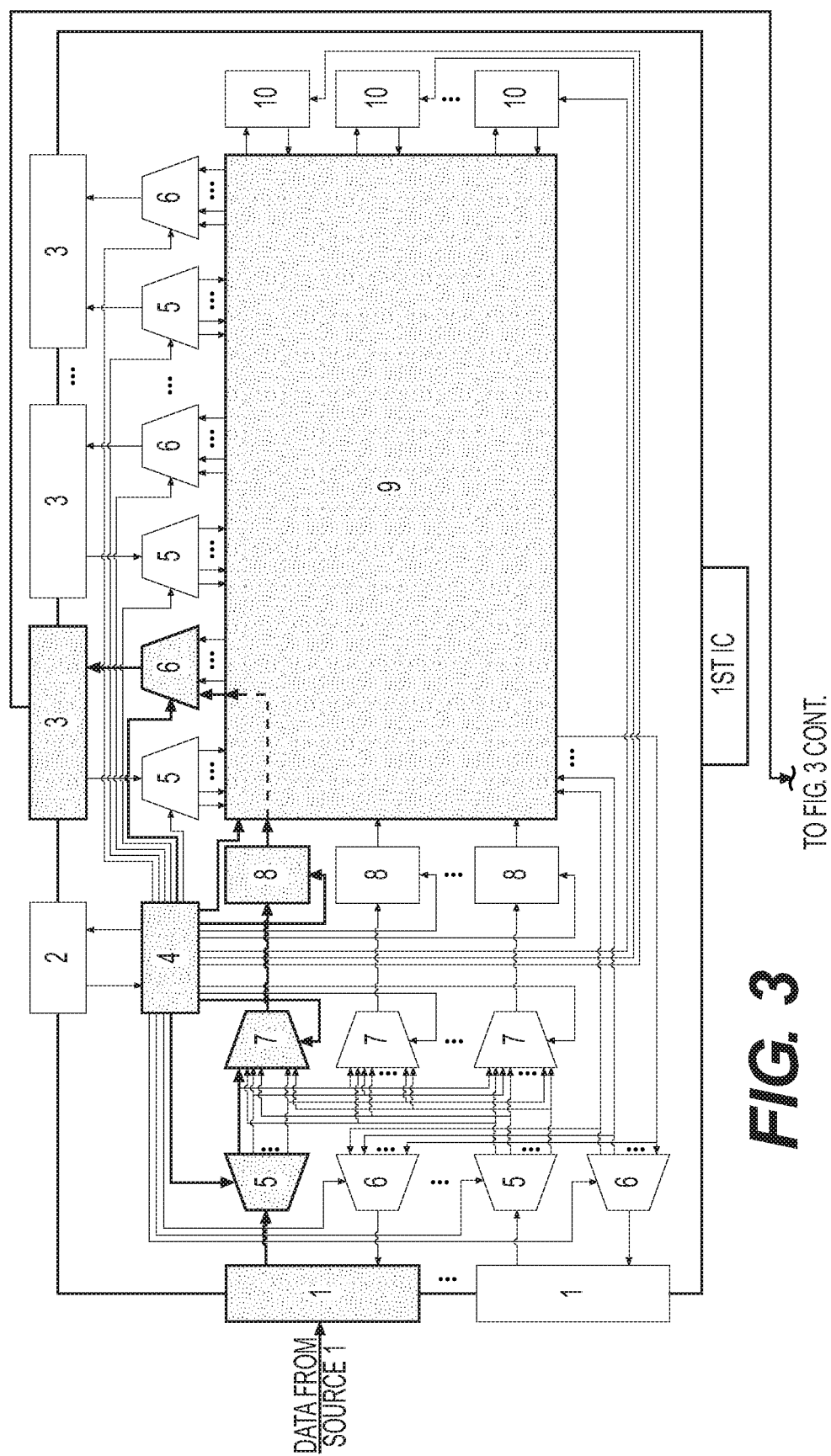
FIG. 3 An embodiment of a beamforming system composed of N integrated circuits. The system has been configured to perform true-time delay beamforming tasks on data from N sources. The active internal blocks and data paths are highlighted in black for illustration purposes only and are not considered as representative of other operation modes.
Figure 3:
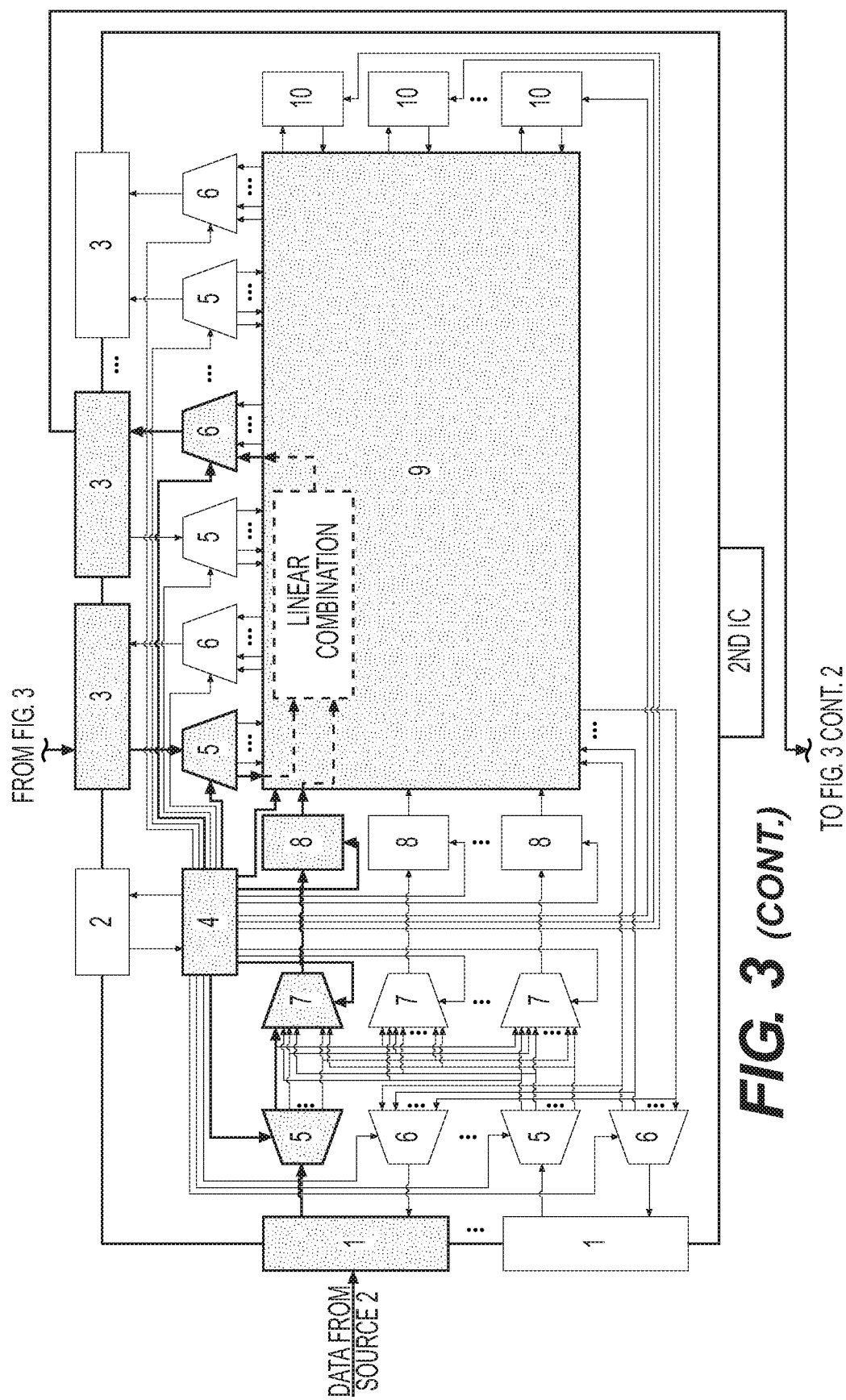

The IC is preferably designed to be highly flexible and allow many operation modes. In one operation mode, illustrated in FIG. 3, a first IC preferably applies a delay-phase correction to one or more data streams received from one source (e.g., a sensor, a set of sensors or a preprocessing device) through one of the IC's I/O interfaces (1). The resulting data streams are routed without further processing by the linear combination and routing logic (9) toward one of the IC's beamforming data interfaces (3). A second IC preferably receives those data streams through one of the second IC's beamforming data interfaces. At the same time, the second IC preferably applies a delay-phase correction to a plurality of data streams received through one of the second IC's I/O interfaces (1) from a second source. Then, the second IC preferably linearly combines these corrected data streams with those received from the first IC by the linear combination and routing logic (9). The weights of each data stream within each of the linear combinations generated have preferably been communicated previously by the configuration and control block (4). The resulting streams can be sent to a third IC, then to a fourth IC and so on. It is evident that this configuration mode may be used to implement a true time-delay beamformer. The last IC in the processing chain may apply a frequency channelization to all or a subset of the resulting linear combinations, which represent the computed beams, and can then be output through the transmitting part of one of the I/O interfaces of the last IC.

Figure 4:
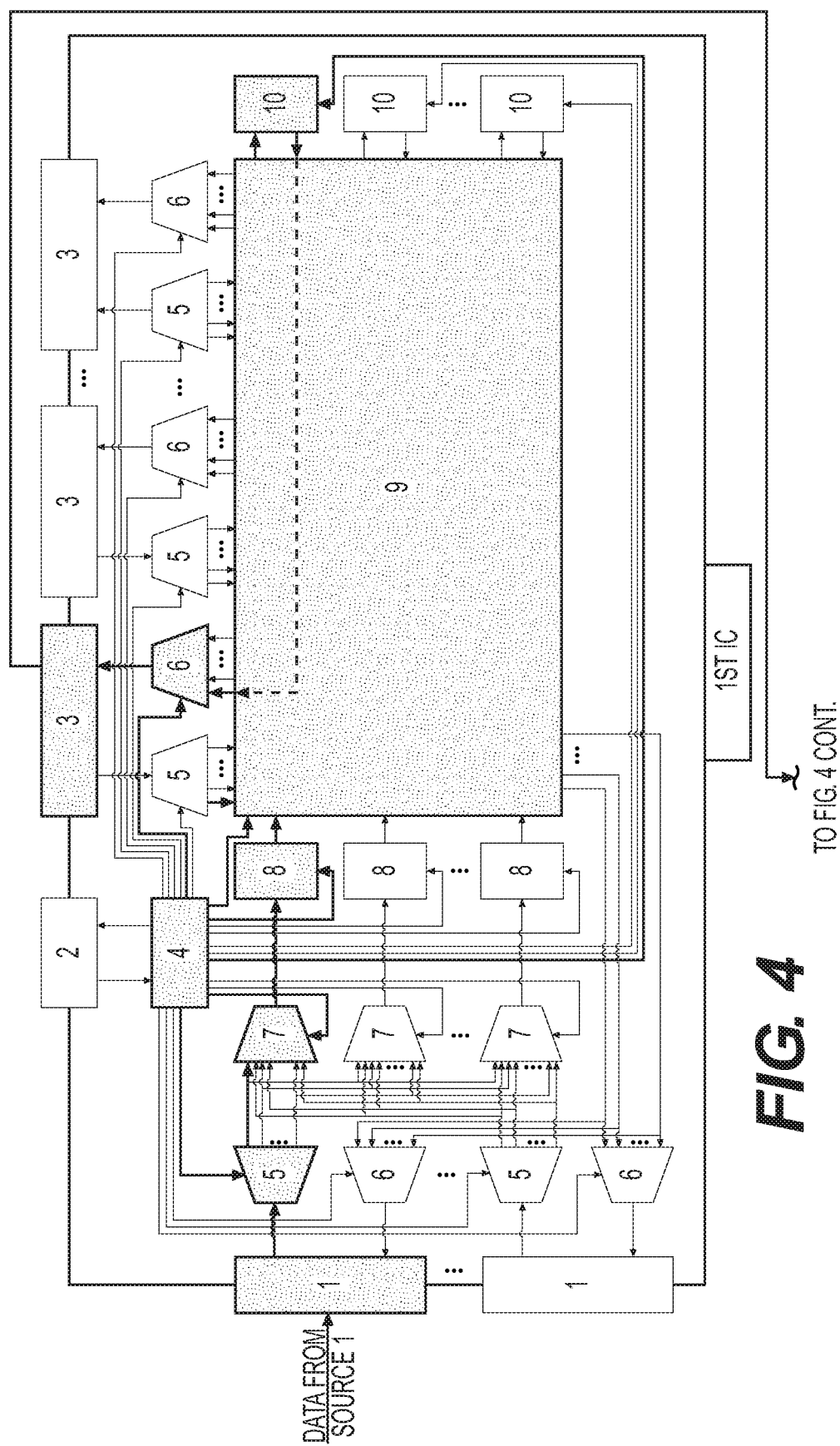
FIG. 4 An embodiment of a beamforming system composed of N integrated circuits. The system has been configured to perform phase-shift beamforming tasks on data from N sources. The active internal blocks and data paths are highlighted in black for illustration purposes only and are not considered as representative of other operation modes.
Figure 4:
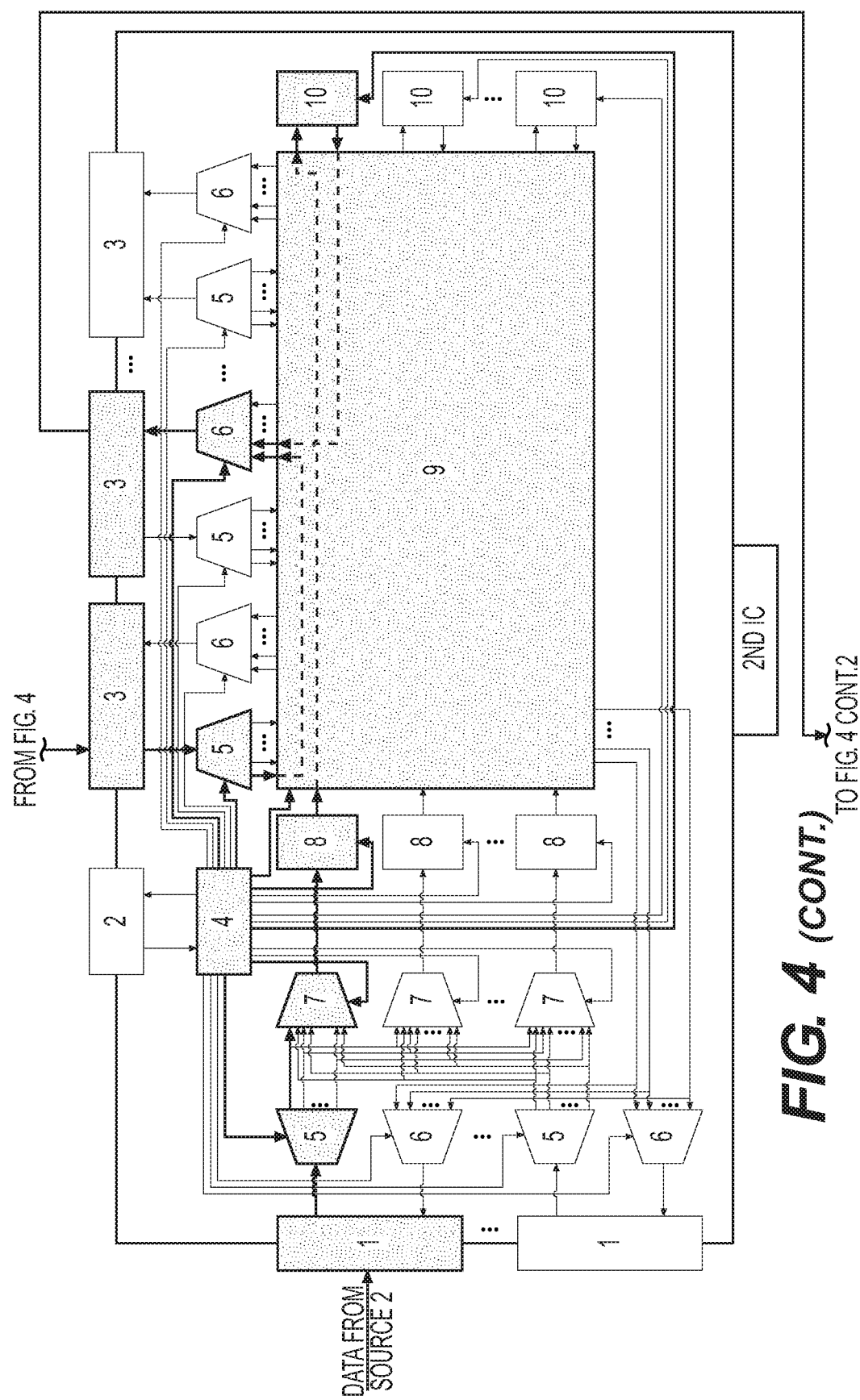

In a second operation mode, illustrated in FIG. 4, a first IC preferably applies the frequency channelization to the data streams that result after applying the delay-phase corrections to its input data streams and passing through the linear combination and routing logic. Then, a subset of the frequency channels can be sent to a second IC through one or more of their respective beamforming data interfaces. Analogously, the second IC preferably processes its input data streams in an identical fashion, that is, by applying a delay-phase correction and a frequency channelization to the data streams. Then, the same set of channels, i.e., the set of channels that correspond to same analog frequency band that was received from the first IC, is preferably selected and both sets from the first and the second ICs are preferably sent from the second IC to a third IC through one or more of their respective beamforming data interfaces. This third IC preferably generates an analogous set of frequency channels from yet another source and they are preferably altogether sent to a fourth IC and so on. At the last IC of the chain, the same set of frequency channels from a collection of sources are preferably linearly combined at the linear combination and routing logic (9) in order to generate a number of beams through phase-shift beamforming. The amount of computational resources allocated within the linear combination and routing logic, and possibly the output throughput available at its I/O interfaces, will preferably limit the maximum number of generated beams. The accuracy of the resulting radiation pattern depends on the frequency channel bandwidth, the sensor array configuration, and the beam steering offset from the direction determined by the applied delay-phase corrections. The unused IC elements (delay-and-phase correcting blocks, frequency channelizers, etc.) could be used to generate additional beams by either true-time delay or phase-shift beamforming, or simply to channelize an input data stream. Since the IC order is logical, but not physical, the IC that is first in a specific beam computation chain, could be intermediate or last (or bypassed) in the logical IC chain used to compute any other beam/s.

Figure 5:
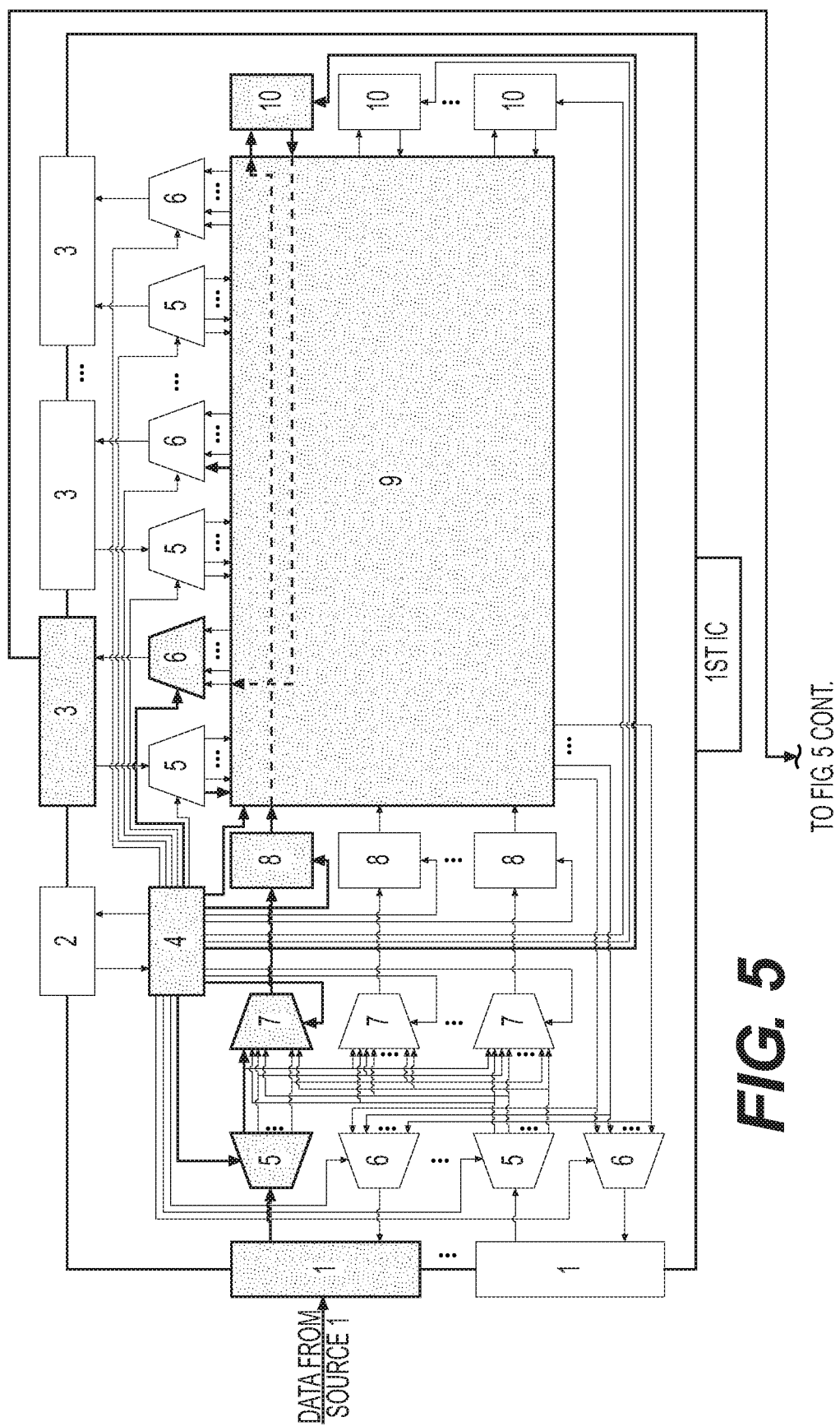
FIG. 5 An embodiment of a beamforming system composed of N integrated circuits. The system has been configured to perform frequency channelization tasks on data from source 2 by means of the second IC, and phase-shift beamforming tasks on data from the remaining (N−1) sources. The second IC relays the received beamforming data for optimal performance of the beamformer. The active internal blocks and data paths are highlighted in black for illustration purposes only and are not considered as representative of other operation modes.
Figure 5:
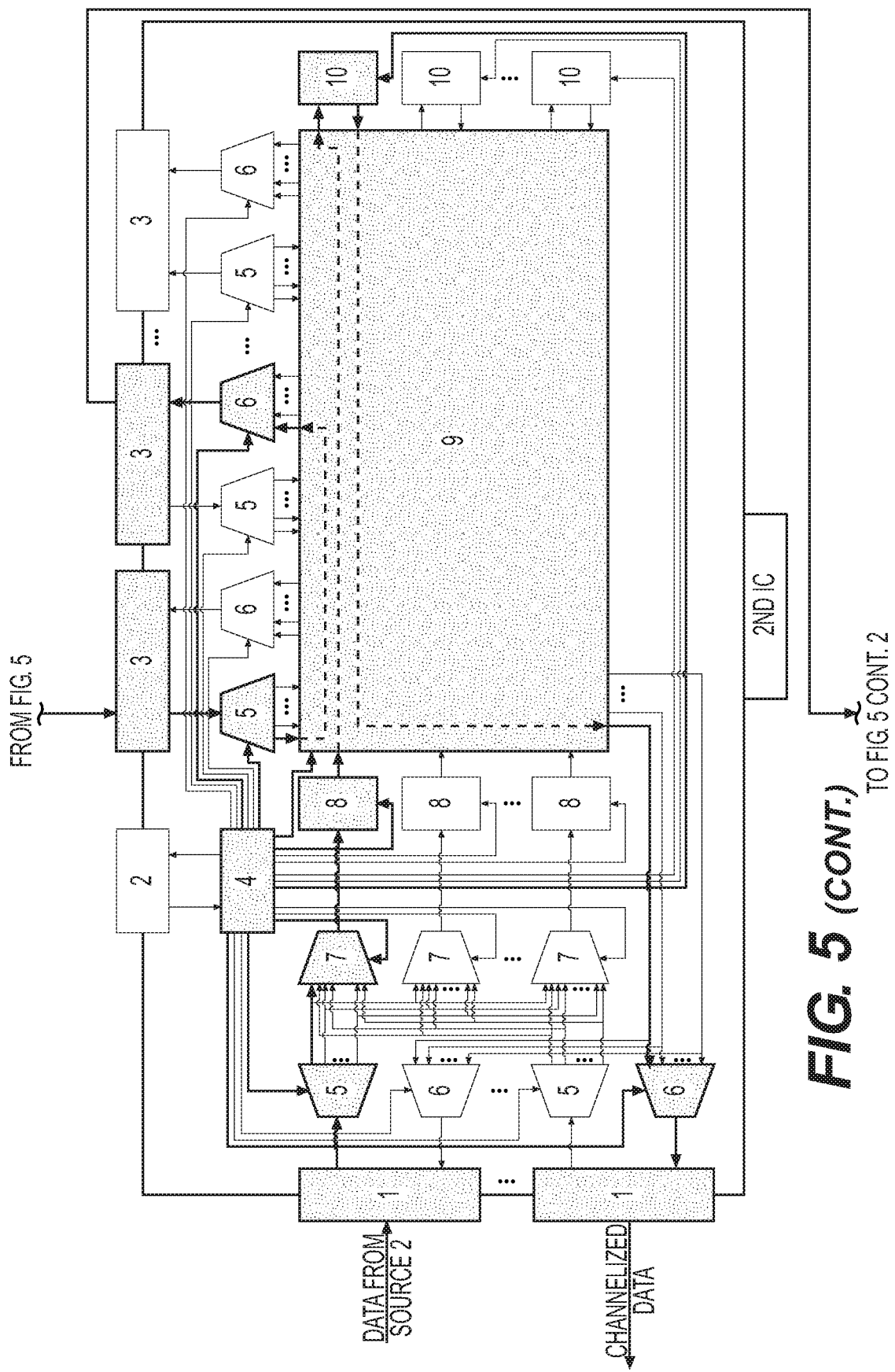

In a third operation mode, an individual IC can be configured to apply a frequency channelization to one or more of its input data streams, which are then output through its I/O interface. The second IC of the exemplary embodiment illustrated in FIG. 5 represents an instance of such operation mode. Additionally, the data streams received through its beamforming data interfaces may be relayed unprocessed to subsequent ICs according to a given network topology. In this operation mode, the IC does not perform beamforming tasks, but only frequency channelization on its input data streams, while allowing beamforming data to be communicated through its beamforming data interfaces for other ICs to perform beamforming tasks.

Many other operation modes are possible enabling features such as the combination of a multiplicity of frequency channelizers into a higher resolution frequency channelizer. Additionally, ICs can be combined in series and/or in parallel. The operation mode is preferably determined by the configuration and control block (4) and can be modified on the fly through a control interface (2). The configuration and control block is preferably also responsible for determining the weights of the various data streams that are linearly combined, the delay and phase model parameters, the spectral response of the frequency channelization filters, and the data stream routing throughout the IC, among other functions. This information is preferably not hardwired in the IC, but rather is communicated through the control interface and may be stored in an external memory or on-chip memory. The configuration and control block may implement one or more security methods of assuring the trustworthiness or the origin of all or a subset of the messages received through any control interface. For example, a public key may be stored in a secured on-chip memory or external memory and be used to unencrypt the incoming messages or to verify a digital signature within the messages. Alternatively, the configuration and control block may admit a "lockout" command, whose legitimacy has been assured by one of the methods described herein, and which inhibits the IC from being externally reconfigured until a subsequent, equally validated "unlock" command is received.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. The term comprising, wherever used, is intended to include the terms consisting and consisting essentially of. Furthermore, the terms comprising, including, and containing are not intended to be limiting. It is intended that the specification and examples be considered exemplary only with the true scope and spirit of the invention indicated by the following claims.

The invention claimed is:

1. An integrated circuit comprising:
one or more input/output interfaces, wherein each input/output interface receives sensor data streams from external sensors and outputs internally generated data streams;
one or more delay and phase correcting blocks, each delay and phase correcting block receiving sensor data streams from the one or more input/output interface and outputting a delay and phase corrected data stream;
one or more beamforming data interfaces, each beamforming data interface adapted to send the internally generated data streams and receive beamforming data streams;
one or more frequency channelizers, each frequency channelizer adapted to split a data stream into multiple channelized data streams, each channelized data stream comprising information from a different range of frequency components; and
a linear combination and routing logic device, wherein the linear combination and routing logic device:
inputs one or more of the delay and phase corrected data streams, the beamforming data streams, and the channelized data streams;
combines the one or more of the delay and phase corrected data streams, the beamforming data streams, and the channelized data streams into the internally generated data streams; and
discards or routes the internally generated data stream to one or more of the input/output interfaces or the beamforming data interfaces; or
routes one or more of the internally generated data streams toward the input of at least one of the one or more frequency channelizers.

2. The integrated circuit of claim 1, wherein the data communications are secured by cryptography.

3. The integrated circuit of claim 1, wherein the cryptograph is at least one of encryption or authentication.

4. The integrated circuit of claim 1, further comprising one or more deserializers, wherein each deserializer demultiplexes a data stream.

5. The integrated circuit of claim 1, further comprising one or more serializer, wherein each serializer multiplexes one or more data streams into a single data stream.

6. The integrated circuit of claim 1, further comprising one or more independent selectors, wherein the independent selectors route the sensor data streams to a delay and phase correcting block.

7. The integrated circuit of claim 6, wherein there is one selector for each delay and phase correcting block.

8. The integrated circuit of claim 1, further comprising a configuration and control block in communication with each component in the integrated circuit.

9. The integrated circuit of claim 8, wherein each delay and phase correcting block applies a fractional or sub-sample delay to its sensor data stream, wherein the delay is determined by the configuration and control block based on parameters updated externally through a control interface.

10. The integrated circuit of claim 8, wherein each delay and phase correcting block applies a phase correction to its sensor data stream, wherein the phase correction is determined by parameters sent from the configuration and control block.

11. The integrated circuit of claim 1, wherein the sensor data stream is pre-processed.

12. A plurality of the integrated circuits of claim 1.

13. The plurality of integrated circuits of claim 12, wherein each beamforming data interface intercommunicates with at least one other beamforming data interface intercommunicates of another integrated circuit.

14. The plurality of integrated circuits of claim 12, comprising, in series, a first integrated circuit, one or more intermediary integrated circuits, and a last integrated circuit.

15. The plurality of integrated circuits of claim 14, wherein:
the first integrated circuit routes a first delay and phase corrected sensor data stream from a first sensor to a first intermediary integrated circuit through one of the first integrated circuit's one or more beamforming data interfaces;
a first intermediary integrated circuit receives the first delay and phase corrected sensor data stream from the first integrated circuit through one of the first intermediary integrated circuit's one or more beamforming data interfaces;
the first intermediary integrated circuit obtains a second delay and phase corrected sensor data stream from a second sensor;
the first intermediary integrated circuit linearly combines the first and second delay and phase corrected sensor data streams into a linearly combined data stream;
the first intermediary integrated circuit routes the linearly combined data stream to another integrated circuit through one of the first intermediary integrated circuit's one or more beamforming data interfaces;
each additional intermediary integrated circuit receives a linearly combined data stream from a previous intermediary integrated circuit through one of the additional intermediary integrated circuit's one or more beamforming data interfaces;
the additional intermediary integrated circuit obtains a delay and phase corrected sensor data stream from an associated sensor;
the additional intermediary integrated circuit linearly combines the linearly combined data stream from a previous intermediary integrated circuit and the delay and phase corrected data stream from an associated sensor into another linearly combined data stream;
each additional intermediary integrated circuit routes the another linearly combined data stream to another integrated circuit through one of the additional intermediary integrated circuit's one or more beamforming data interfaces;
the last integrated circuit receives linearly combined data stream from a previous intermediary integrated circuit through one of the last integrated circuit's one or more beamforming data interfaces;
the last integrated circuit obtains a last delay and phase corrected sensor data stream from a last sensor;
the last integrated circuit linearly combines the linearly combined data stream from the previous intermediary integrated circuit and the last delay and phase corrected sensor data stream into a last linearly combined data stream; and
the last integrated circuit transmits the last linearly combined data stream from one of the last integrated circuit's one or more input/output interfaces.

16. The plurality of integrated circuits of claim 15, wherein the last integrated circuit applies a frequency channelization to each or a subset of the linear combination data streams.

17. The plurality of integrated circuits of claim 14, wherein:
the first integrated circuit applies frequency channelization to a first delay and phase corrected sensor data stream;
the first integrated circuit transmits a subset of frequency channels to a first intermediary integrated circuit through one or more of the first integrated circuit's beamforming data interfaces;
a first intermediary integrated circuit applies frequency channelization to a second delay and phase corrected sensor data stream;
the first intermediary integrated circuit selects channels that correspond to the subset of frequency channels of the first integrated circuit;
the first intermediary integrated circuit transmits the subset of frequency channels of the first integrated circuit and the first intermediary integrated circuit to a subsequent intermediary integrated circuit through one or more of the first integrated circuit's beamforming data interfaces;
each additional intermediary integrated circuit applies frequency channelization to an associated delay and phase corrected sensor data stream;
the additional intermediary integrated circuit selects channels that correspond to the subset of frequency channels of a previous intermediary integrated circuit;
the additional intermediary integrated circuit transmits the subset of frequency channels of the previous intermediary integrated circuit and the additional intermediary integrated circuit to a subsequent intermediary integrated circuit through one or more of the additional intermediary integrated circuit's beamforming data interfaces;

the last integrated circuit applies frequency channelization to a last delay and phase corrected sensor data stream;

the last integrated circuit selects channels that correspond to the subset of frequency channels of a previous intermediary integrated circuit; and the last integrated circuit linearly combines the subset of frequency channels of the previous intermediary integrated circuit and the last integrated circuit to generate a number of beams through phase-shift beamforming.

18. The plurality of integrated circuits of claim 14, wherein:

at least one intermediary integrated circuit:
applies a frequency channelization to one or more input data streams;
outputs the frequency channelized data stream through at least one of the input/output interfaces; and
receives and subsequently relays, through at least one beamforming data interfaces, beamforming data streams, unprocessed, to a subsequent integrated.

* * * * *